(12) United States Patent  (10) Patent No.: US 7,410,310 B2
Kihara  (45) Date of Patent: Aug. 12, 2008

(54) BLADE DRIVING APPARATUS FOR CAMERAS

(75) Inventor: Tomokazu Kihara, Tokyo-to (JP)

(73) Assignee: Nidec Copal Corporation, Tokyo (JP)

( * ) Notice: Subject to any disclaimer, the term of this patent is extended or adjusted under 35 U.S.C. 154(b) by 328 days.

(21) Appl. No.: 11/168,326

(22) Filed: Jun. 29, 2005

(65) Prior Publication Data

US 2005/0286889 A1 Dec. 29, 2005

(30) Foreign Application Priority Data

Jun. 29, 2004 (JP) .............................. 2004-191908

(51) Int. Cl.
  *G03B 9/08* (2006.01)
  *G03B 9/02* (2006.01)
  *H04N 5/238* (2006.01)
  *H01H 9/00* (2006.01)
  *H01H 47/00* (2006.01)

(52) U.S. Cl. ........................ 396/463; 396/508; 361/160; 348/368

(58) Field of Classification Search ................. 396/449, 396/452, 454, 458, 486, 493, 510, 463, 508; 348/363, 367, 368; 353/88, 97, 119; 359/230, 359/234
See application file for complete search history.

(56) References Cited

U.S. PATENT DOCUMENTS

| 6,554,502 | B2 * | 4/2003 | Naganuma | 396/454 |
| 6,733,192 | B2 | 5/2004 | Watanabe et al. | 396/463 |
| 6,933,980 | B1 * | 8/2005 | Matsumoto | 348/363 |
| 7,210,795 | B2 * | 5/2007 | Hara et al. | 353/88 |
| 2001/0041074 | A1 * | 11/2001 | Yaginuma et al. | 396/458 |

FOREIGN PATENT DOCUMENTS

JP 2003-186079 7/2003

* cited by examiner

*Primary Examiner*—Melissa Jan Koval
(74) *Attorney, Agent, or Firm*—Sterne, Kessler, Goldstein & Fox P.L.L.C.

(57) ABSTRACT

A blade driving apparatus for cameras includes a base plate having an aperture for a photographing optical path; a cover plate having the aperture for the photographing optical path, provided with a blade chamber between the base plate and the cover plate; at least one blade rotatably mounted to the base plate in the blade chamber; and at least one electromagnetic driving source driving the blade. The electromagnetic driving source includes a rotor magnetized to have a plurality of magnetic poles at preset angles on its peripheral surface and having a driving pin for driving pin for driving the blade by its rotation, a yoke having a plurality of magnetic pole sections opposite to the peripheral surface of the rotor, and a coil wound through the yoke. At least, the rotor and the yoke are interposed between the base plate and the cover plate so that, at least, the rotor is rotatably mounted to the base plate.

11 Claims, 9 Drawing Sheets

BLADE DRIVING APPARATUS FOR CAMERAS

BACKGROUND OF THE INVENTION

1. Field of the Invention

This invention relates to a blade driving apparatus for cameras in which each of a shutter device, a stop device, and a filter device is constructed as an independent unit, or at least two of them are constructed as one unit.

2. Description of Related Art

A lens shutter device (hereinafter referred to as a shutter device), a stop device, and a filter device, in recent years, incorporated in a camera have blade members so that they are reciprocated by an electromagnetic driving source (an actuator such as a motor or a plunger). Such shutter devices are often designed so that two shutter blades are rotated in opposite directions. However, some of the shutter devices incorporated in cameras of extremely small lens diameters, including cameras for mobile phones, are constructed with a single shutter blade.

Recently, stop devices incorporated in cameras of relatively small lens diameters have come to be used only for the purpose of controlling the amount of light. Some of the stop devices are constructed so that a plurality of stop blades are actuated simultaneously to restrict a plurality of stop apertures. In many cases, however, the stop devices are such that a single stop blade having an aperture section for a circular stop aperture is provided and is introduced into, and removed from, an exposure aperture when the necessity arises. The stop device of such a type may include a plurality of stop blades that are different in diameter of the aperture section.

Filter devices, in many cases, are provided with a blade member similar in shape to the stop blade having the circular aperture section (however, the aperture section may have almost the same size as the exposure aperture) so that an ND filter plate is mounted on the blade member to cover the aperture section in the proximity of the aperture section and thereby is constructed as a filter blade. In some of the filter devices, however, two blade members having such circular aperture sections are provided and a blade member fabricated only with the ND filter plate is held between them so that these three members are rotated and returned in the same direction simultaneously as if they were a single blade. The filter device of this type may include a plurality of filter blades in which aperture sections are different in diameter or ND filter plates are different in density.

As mentioned above, the shutter device, the stop device, and the filter device in which the shutter blade, the stop blade, and filter blade are actuated by the electromagnetic driving source may be individually unified, but two or more devices may be constructed as one unit. Even when they are individually unified, an opening shutter blade and a closing shutter blade may be actuated by independent electromagnetic driving sources in the shutter device. In some of the stop devices, as mentioned above, the plurality of stop blades different in diameter of the aperture section are actuated by independent electromagnetic sources. In some of the filter devices, the plurality of filter blades in which aperture sections are different in diameter or ND filter plates are different in density are actuated by independent electromagnetic driving sources. In the case of the blade driving apparatus for cameras provided with two kinds of blade members actuated by independent electromagnetic sources, the two kinds of blade members may be arranged in the same blade chamber, but may be placed in separate blade chambers.

In addition to being used in digital cameras provided with solid-state image sensors, such as digital still cameras, digital video cameras, monitoring cameras, and cameras for information communication end devices, various types of blade driving apparatuses for cameras unified as mentioned above can be used in conventional silver-halide film cameras and video cameras. Of these devices, shutter devices of extremely preferred structures in which the slim design of the entire unit is attained by reducing the dimension of the electromagnetic driving source in the direction of the optical axis are set forth in Japanese Patent Kokai Nos. 2003-186079 and 2004-32873.

In various types of blade driving apparatuses for cameras mentioned above, as well as in the shutter devices constructed as the description in Kokai Nos. 2003-186079 and 2004-32873, it is common practice to mount the electromagnetic driving source, such as the motor, to one surface of a base plate and the blade to the other surface. Thus, when an operator holds the base plate with his hand to carry out assembly work, handling of components including the base plate becomes very cumbersome. Alternatively, when the operator places the base plate on a work bench (also called an assembly tool) to do the assembly work, he must turn the base plate inside out, and thus at least two kinds of work benches for exclusive use become necessary. This is unfavorable in view of manufacturing costs.

The electromagnetic driving sources disclosed in Kokai Nos. 2003-186079 and 2004-32873, in contrast with those set forth, for example, in Japanese Patent Kokai Nos. 2002-139765 and 2003-5251, are capable of reducing dimensions in the direction of the optical axis, irrespective of the same kind of electromagnetic driving source in function, and have favorable structures for the slim design of the entire apparatus. However, even in the case of the electromagnetic driving source of the type set forth in each of Kokai Nos. 2003-186079 and 2004-32873, a plate member is required to place a rotor between one surface of the base plate and the plate member and must be made relatively thick for the purpose of protecting the blade driving apparatus in treatment such as carrying. Consequently, in order to incorporate the blade driving apparatus in an ultra slim design camera, a further consideration is required.

SUMMARY OF THE INVENTION

It is, therefore, an object of the present invention to provide the blade driving apparatus for cameras of low cost in which components of the electromagnetic driving source and the blades are mounted not to both surfaces of the base plate as in conventional practice, but to one surface of the base plate, thereby allowing assembly work to be facilitated and the number of components to be reduced.

It is another object of the present invention to provide the blade driving apparatus for cameras in which the thickness of the entire apparatus can be made smaller than in a conventional blade driving apparatus when the electromagnetic driving source of the type described in each of Kokai Nos. 2003-186079 and 2004-32873 is adopted.

In order to achieve the above objects, the blade driving apparatus for cameras of the present invention comprises a base plate having an aperture section for a photographing optical path; a cover plate having the aperture section for the photographing optical path, provided with a blade chamber between the base plate and the cover plate; at least one blade rotatably mounted to the base plate in the blade chamber; and at least one electromagnetic driving source driving the blade. The electromagnetic driving source includes a rotor magnetized to have a plurality of magnetic poles at preset angles on its peripheral surface and having a driving pin for driving the blade by its rotation, a yoke having a plurality of magnetic pole sections opposite to the peripheral surface of the rotor, and a coil wound through the yoke. At least, the rotor and the yoke are interposed between the base plate and the cover plate so that, at least, the rotor is rotatably mounted to the base plate. In this case, when the rotor has a through-hole at its center of rotation so that the through-hole is rotatably fitted to a shank provided on the base plate, setting of the rotor to the base plate is facilitated.

When the blade driving apparatus for cameras of the present invention is constructed so that a partition plate having the aperture section for the photographing optical path is interposed between the base plate and the cover plate, the electromagnetic driving source is placed between the base plate and the partition plate, and the blade chamber is provided between the partition plate and the cover plate, a plane shape of the entire apparatus can be made small. When the blade driving apparatus for cameras is also constructed so that the yoke is held, together with the coil, between the base plate and the cover plate or between the base plate and the partition plate, the mounting member of a stator becomes unnecessary, resulting in low cost.

The blade driving apparatus for cameras of the present invention may be constructed so that an intermediate plate having the aperture section for the photographing optical path is interposed between the base plate and the cover plate or between the partition plate and the cover plate; two blade chambers are provided, with the intermediate plate as a boundary between them; two electromagnetic driving sources are interposed between the base plate and the intermediate plate or between the base plate and the partition plate; and blades independently driven by the electromagnetic driving sources are housed in the two blade chambers, with at least one blade in each chamber. In such a case, the operation of each blade is extremely stabilized.

In order to achieve the above objects, the blade driving apparatus for cameras of the present invention comprises a base plate having an aperture section for a photographing optical path and at least, a first shank provided to one surface; a cover plate having the aperture section for the photographing optical path and at least, a first hole to construct a blade chamber between the base plate and the cover plate; at least one blade having a hole and a slot; a rotor constructed of a permanent magnet, having a driving pin engaged with the slot of the blade to operate the blade, a through-hole at the center of rotation, and a plurality of magnetic pole sections on the peripheral surface; and a yoke having a plurality of magnetic poles opposite to the peripheral surface of the rotor, fitted into a bobbin around which the coil is wound. The yoke is mounted on the one surface of the base plate and the through-hole of the rotor is rotatably fitted to the first shank. Then, the hole of the blade is rotatably fitted to the first shank and the slot of the blade is engaged with the driving pin. The first hole is fitted into the first shank to thereby mount the cover plate to the base plate so that the yoke and the bobbin are held between the base plate and the cover plate.

In the blade driving apparatus for cameras of the present invention, the base plate is provided with a second shank in addition to the first shank; the cover plate is provided with a second hole in addition to the first hole; the hole of the blade is rotatably fitted to the first shank or the second shank and the slot of the blade is engaged with the driving pin; and the first hole and the second hole are fitted to the first shank and the second shank, respectively, so that the cover plate is mounted to the base plate.

Further, in the blade driving apparatus for cameras of the present invention, the base plate is provided with a second shank in addition to the first shank; the cover plate fails to have the first hole and is provided with a second hole different from the first hole; the hole of the blade is rotatably fitted to the second shank and the slot of the blade is engaged with the driving pin; and the second hole is fitted to the second shank so that the cover plate is mounted to the base plate.

The present invention may be constructed so that a partition plate having the aperture section for photography is interposed between the yoke fitted into the bobbin and the cover plate, and the blade chamber is provided between the partition plate and the cover plate. In this case, instead of the at least one blade, two blades are provided so that one has the hole rotatably fitted to the first shank and the other has the hole rotatably fitted to the second shank. When the present invention is constructed so that these two blades are rotated in opposite directions by the driving pins engaged with the slots of the two blades, a structure mainly suitable for the shutter device is obtained.

The present invention may be further constructed so that an intermediate plate having the aperture section for the photographing optical path is interposed between the base plate and the cover plate or between the partition plate and the cover plate; two blades chambers are provided, with the intermediate plate as a boundary between them; two sets of yokes fitted into the bobbins and rotors are arranged between the base plate and the intermediate plate or between the base plate and the partition plate; and blades independently driven by the rotors are provided in the two blade chambers, at least one in each chamber.

In the blade driving apparatus for cameras in which each of the shutter device, the stop device, and the filter device, driven by the electromagnetic driving source such as the motor, is constructed as an independent unit, or at least two of these devices are constructed as one unit, the present invention is designed so that all components are mounted to one surface of the base plate, and thus has the advantages of facilitating the assembly work and of reducing the manufacturing cost. Moreover, since all components are assembled in turn with respect to one surface of the base plate, a first assembled component is pressed against the base plate side by a subsequently assembled component. Whereby, the whole number of fixing members (means) can be made smaller than in a conventional structure, and this offers a cost advantage. In case adopting the type described in each of Kokai Nos. 2003-186079 and 2004-32873 as the electromagnetic driving source, there is the advantage that the dimension in the direction of the optical axis is further reduced so that the slim design of the entire apparatus is attained.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 4:
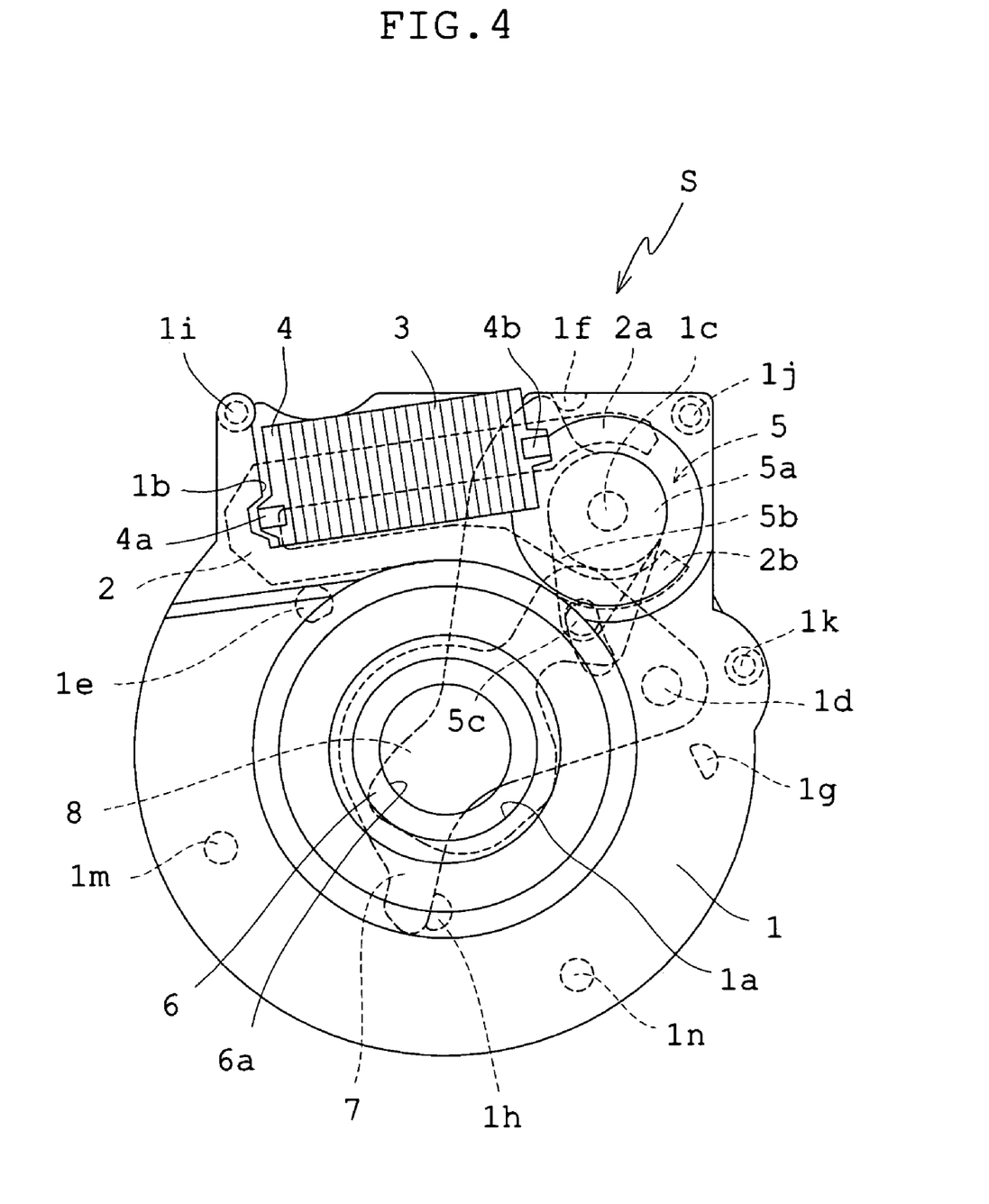
FIG. 4 is a view showing a state of Embodiment 1 where the aperture is closed by the shutter blades just after finishing photography.
Figure 5A:
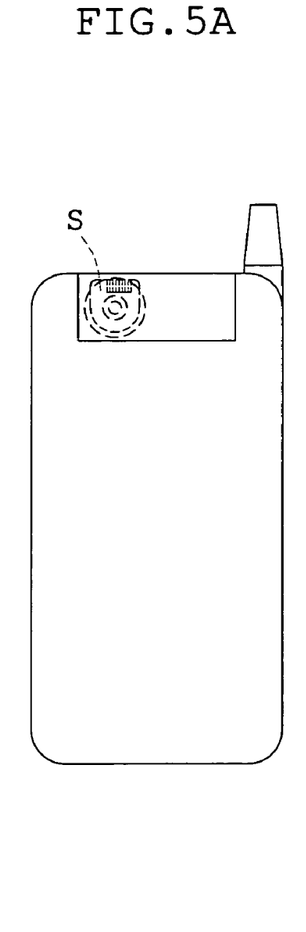
FIG. 5A is a front view showing an example of a mobile phone incorporating the shutter device of Embodiment 1 when the phone is not used.
Figure 5B:
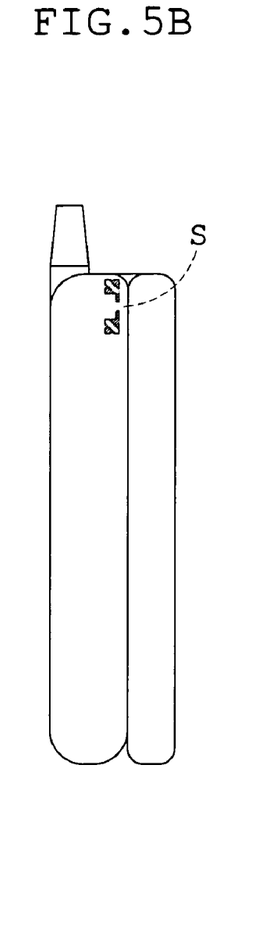
FIG. 5B is a side view from the left side of FIG. 5A showing the mobile phone.
Figure 5C:
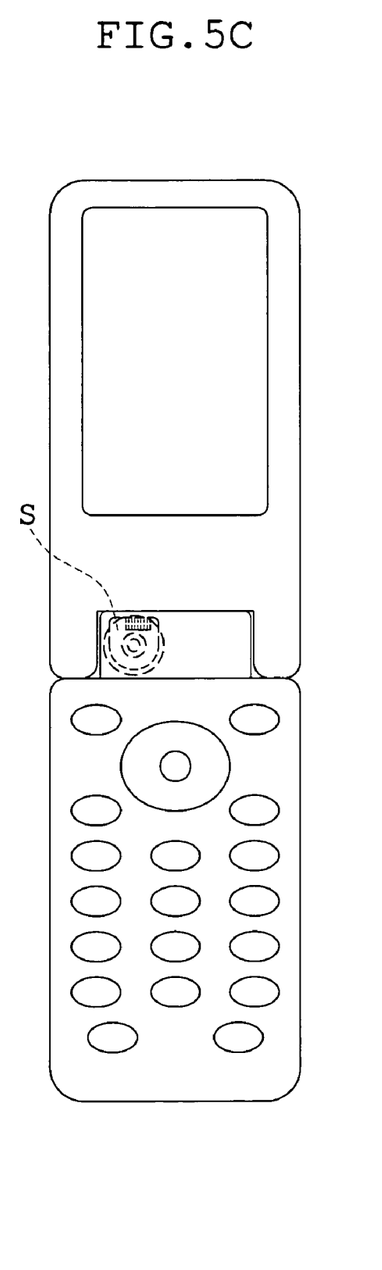
FIG. 5C is a front view showing the mobile phone when it is used.
Figure 6:
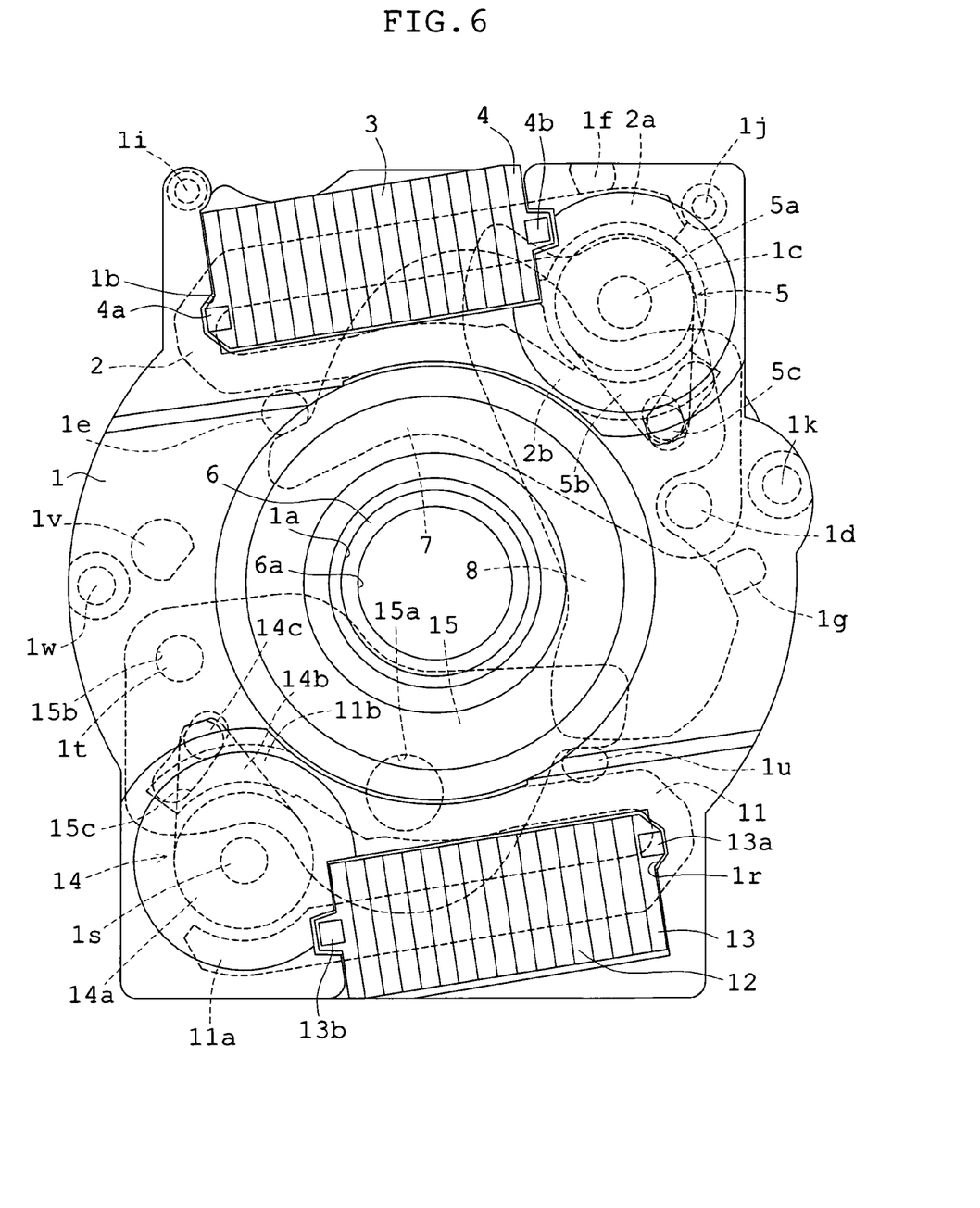
FIG. 6 is a plan view showing a state of Embodiment 2 before photography.
Figure 7:
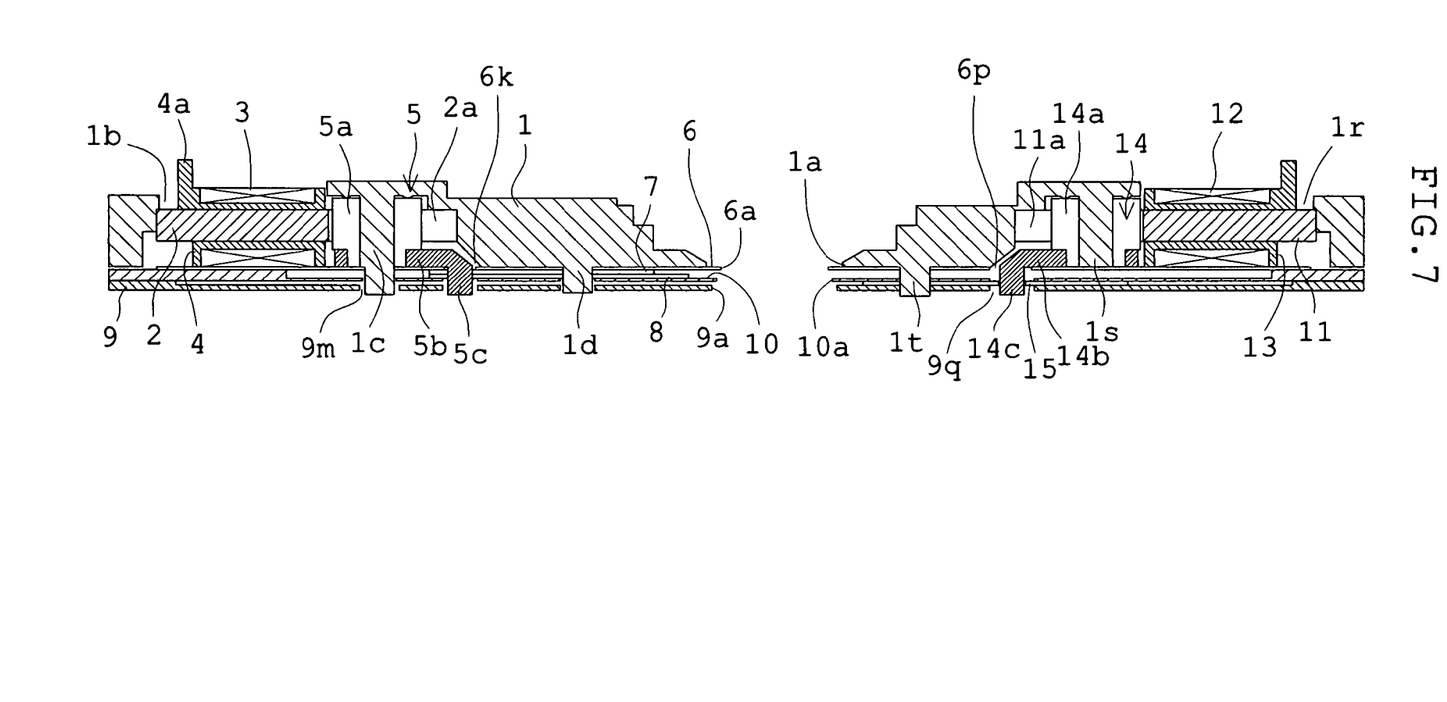
FIG. 7 is a sectional view showing a state of Embodiment 2 of FIG. 6.
Figure 8:
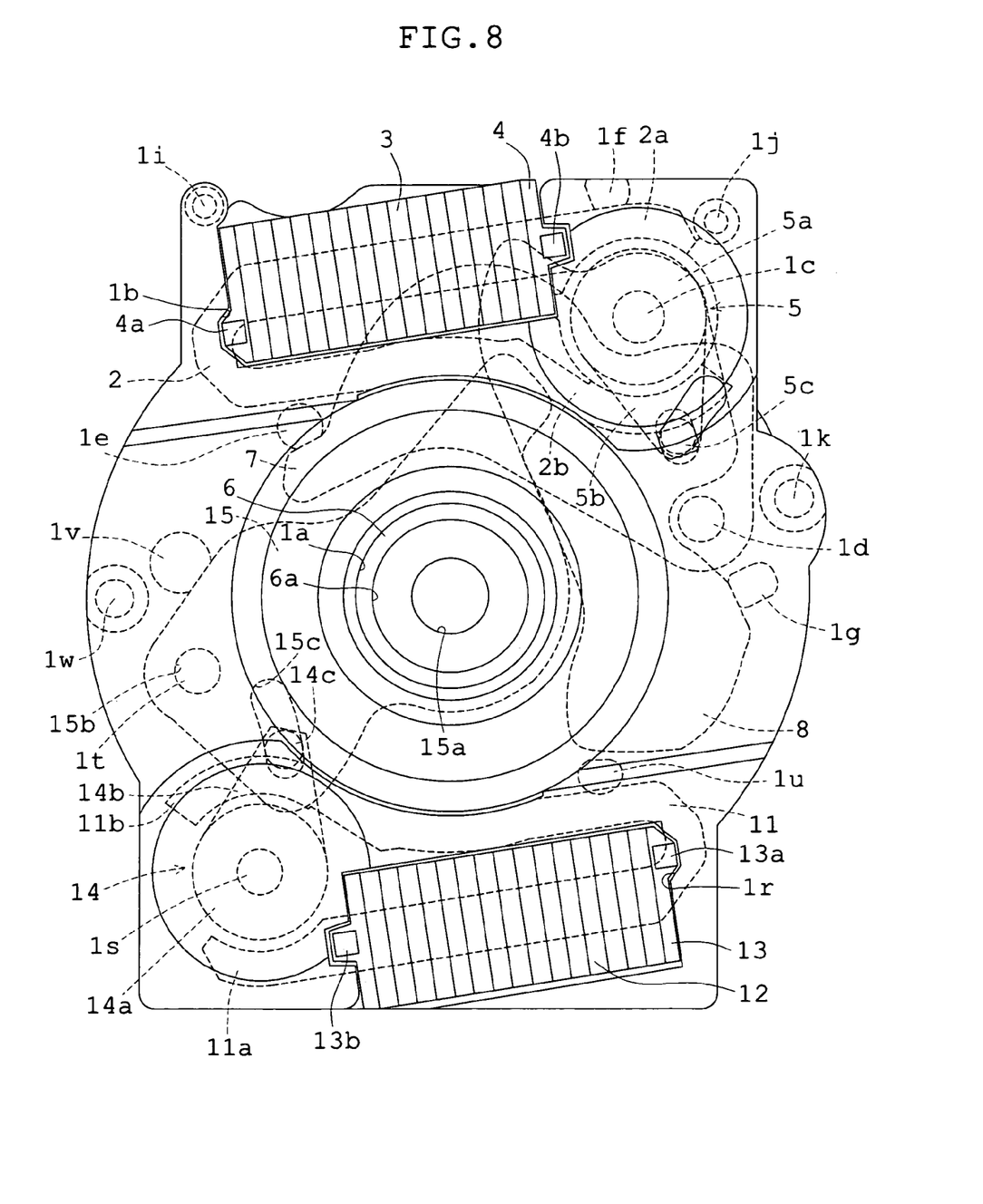
FIG. 8 is a plan view showing a state of Embodiment 2 where a stop blade is operated in photography.

In accordance with the embodiments shown in the drawings, aspects of the present invention will be explained. The present invention can be adopted for silver-halide film cameras, as well as for various digital cameras, with respect to small-sized cameras. As mentioned above, each of the shutter device, the stop device, and the filter device may be constructed as an independent unit, or at least two of these devices may be constructed as one unit. Two embodiments are designed so that they can also be adopted for cameras for information communication terminal devices such as mobile phones. In Embodiment 1, only the shutter device is constructed as a unit, and in Embodiment 2, the shutter device and the stop device are constructed as one unit. Also, FIGS. 1-5 illustrate Embodiment 1 and FIGS. 6-8 illustrate Embodiment 2.

Embodiment 1

Figure 1:
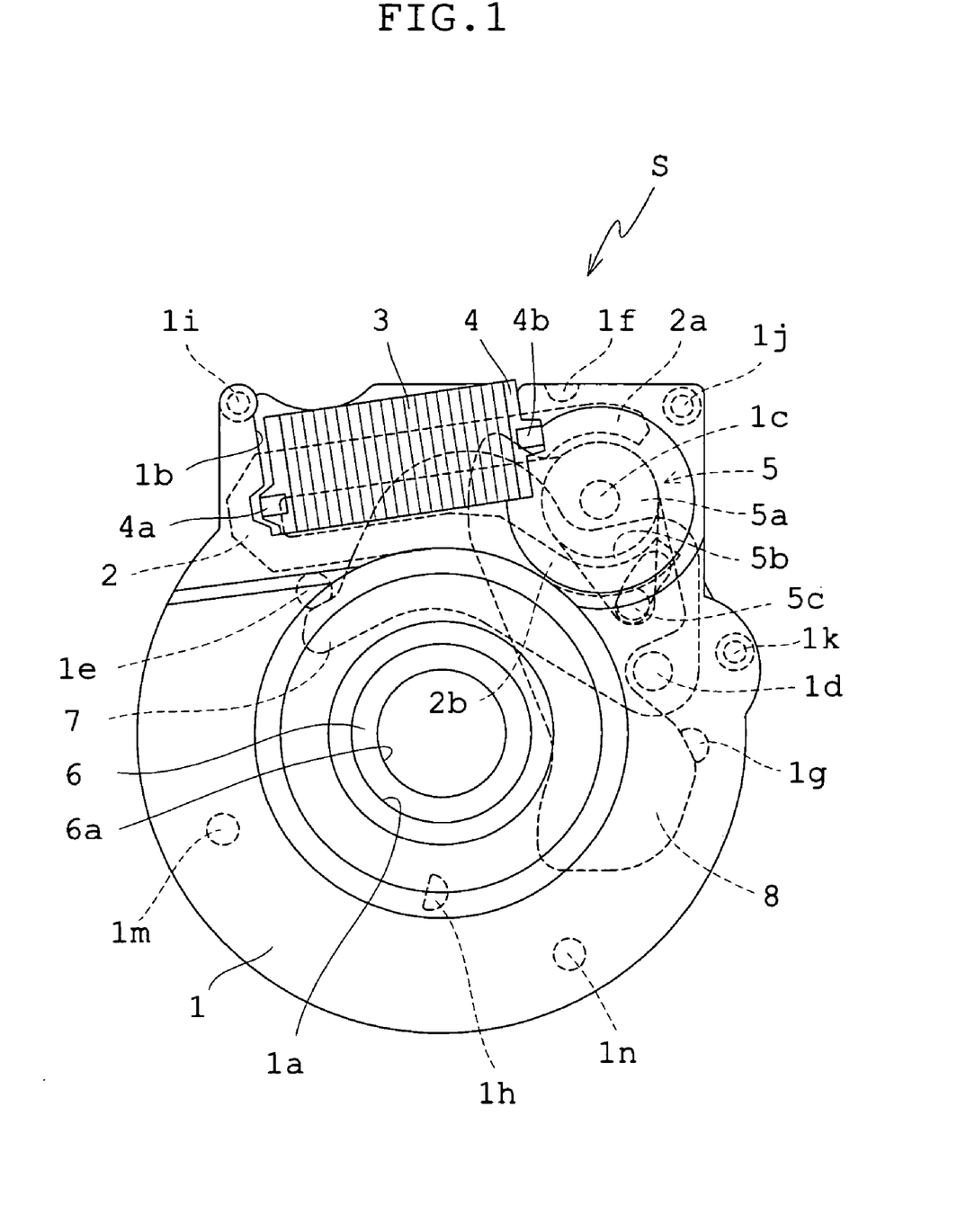
FIG. 1 is a view showing a state of Embodiment 1 where an aperture is fully opened by shutter blades before photography.

The structure of this embodiment will be first described. FIG. 1 shows the shutter device S of the embodiment, viewed from the object side. In a state where the shutter device is set to the camera, therefore, a solid-state image sensor is placed on the back side of FIG. 1. A base plate 1, made of synthetic resin, is constructed of a relatively thick member because all components to be described later are mounted to the base plate. The base plate 1 has a circular aperture section $1a$ for a photographing optical path at about the middle and a notch $1b$ on a part of the periphery. The object side of the aperture section $1a$ is configured into a concavity such that a diameter increases gradually and at least one part of a photographic lens is placed in the concavity so that the slim design of the camera is achieved. The surface on the solid-state image sensor side of the base plate 1 is provided with a step shank $1c$ consisting of a thick shank portion on the base plate side and a fine shank portion on the top side (see FIGS. 3A and 3B) and a shank $1d$. In addition to these, it is also provided with four shank-shaped stoppers $1e$, $1f$, $1g$, and $1h$; three mounting shanks $1i$, $1j$, and $1k$; and two tapped holes $1m$ and $1n$.

On the surface on the solid-state image sensor side of the base plate 1, first, the electromagnetic driving source is set. The electromagnetic driving source of the embodiment, like that described in each of Kokai Nos. 2003-186079 and 2004-32873, is a current-controlled actuator, usually called as a moving-magnet motor, in which a rotor having a permanent magnet is capable of rotating within a preset angle of rotation in a direction according to a direction in which the coil of a stator is energized. The electromagnetic driving source of the embodiment is similar in structure to that described in Kokai No. 2003-186079, rather than in Kokai No. 2004-32873. However, the electromagnetic driving source of the embodiment, unlike those described in Kokai Nos. 2003-186079 and 2004-32873, has the advantage that fixing means (screws) exclusively used to mount the driving source to the base plate 1 are unnecessary.

In the electromagnetic driving source (hereinafter referred to as an actuator) of the embodiment, the stator includes a yoke 2, a coil 3, and a bobbin 4. The yoke 2 is shaped like a letter "U" and has two ends constructed as magnetic pole sections $2a$ and $2b$. In the bobbin 4 around which the coil 3 is wound, terminal pins $4a$ and $4b$ are configured and both ends of the coil 3, although not clearly shown, are wound around these pins. On the other hand, a rotor 5 includes a cylindrical permanent magnet $5a$ having a circular peripheral surface; a projection $5b$ made of synthetic resin, constructed integrally with the permanent magnet $5a$ and projected in a radial direction; and a driving pin $5c$ provided at the top of the projection $5b$. In the permanent magnet $5a$, its peripheral surface is magnetized to have two poles every 180 degrees, but it may be magnetized to have four poles every 90 degrees. It is known that the rotor of the actuator of this type is made with the permanent magnet, including the projection $5b$ and the driving pin $5c$, and also that the driving pin $5c$ is provided inside the peripheral surface of the permanent magnet $5a$. In the present invention, however, the rotor constructed as mentioned above is also applied.

Figure 3A:
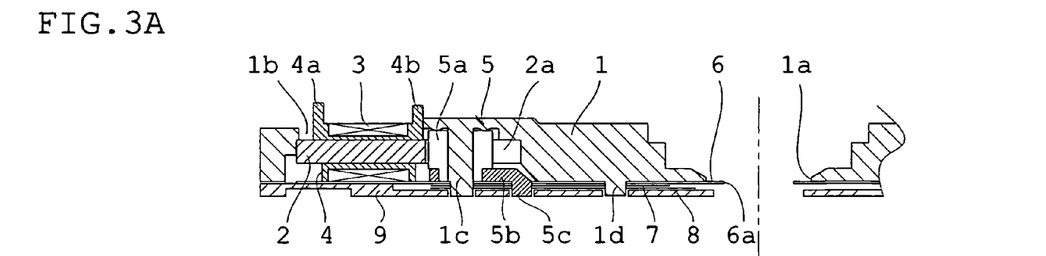
FIG. 3A is a sectional view from the left side of FIG. 1 showing a state where the assembly of Embodiment 1 is completed.
Figure 3B:
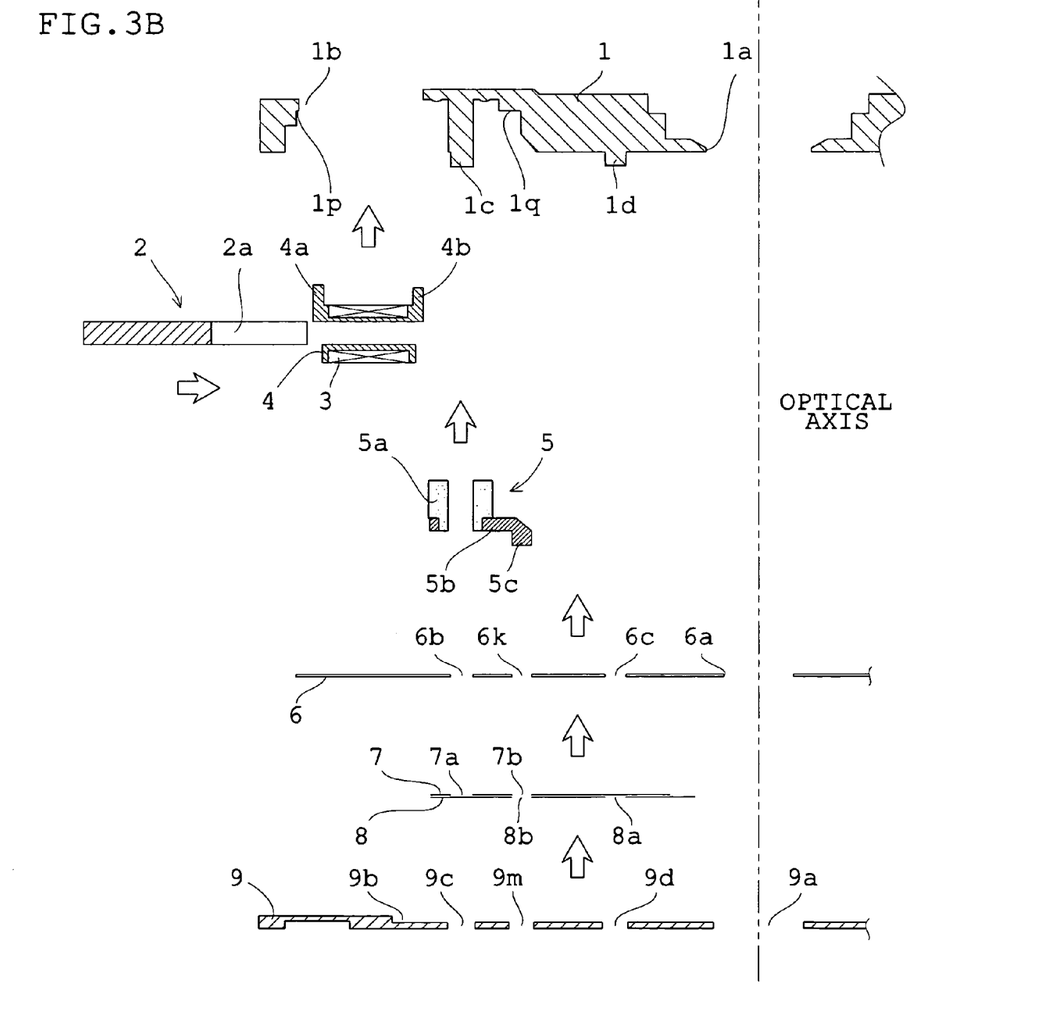
FIG. 3B is an explanatory view showing the assembly order of individual members in order to illustrate the process of assembly in FIG. 3A.

When such components of the actuator are set to the base plate 1, the surface on the solid-state image sensor side of the base plate 1 is held upward (that is, the base plate 1 of FIG. 3B is turned upside down) so that the components are dropped in turn. Specifically, the rotor 5 is held so that the driving pin $5c$ is directed upward, and the through-hole of the permanent magnet $5a$ is rotatably fitted to the thick shank portion of the step shank $1c$ of the base plate 1. In the stator, the magnet pole section $2a$ of the yoke 2 is passed through a hollow section of the bobbin 4, and the terminal pins $4a$ and $4b$ are directed toward the side of the base plate 1 so that the stator is inserted in the notch $1b$. Whereby, the yoke 2 is mounted on step portions $1p$ and $1q$ configured on the base plate 1 and the magnetic pole sections $2a$ and $2b$ are set to be opposite to the peripheral surface of the permanent magnet $5a$. In a state where the yoke 2 is mounted on the step portions $1p$ and $1q$ (that is, in a state of FIG. 3A), the yoke 2 is such that movement in a direction perpendicular to the shank $1c$ is prevented by the plane shape of the step portions $1p$ and $1q$. In FIG. 3A, for being engaged with the base of the U-shaped yoke 2, the bobbin 4 does not move toward the left, and it's movement toward the right is prevented by the edge of the notch $1b$. Consequently, in this assembled state, only the terminal pins $4a$ and $4b$ of the bobbin 4 protrude from the surface of the base plate 1 on the object side, and any other components are practically placed within the thickness of the base plate 1.

In the embodiment, a thin metallic partition plate 6 is mounted to the base plate 1. The partition plate 6 has a circular aperture section $6a$ for the photographing optical path at about the middle so that the diameter of the aperture section $6a$ is smaller than that of the aperture section $1a$ of the base plate 1 to restrict the exposure aperture as a shutter device unit in the embodiment. In mounting the partition plate 6, a hole $6b$ is fitted to the fine shank portion of the step shank $1c$; a hole $6c$ is fitted to the shank $1d$; holes $6d$, $6e$, and $6f$ are fitted to the stoppers $1e$, $1g$, and $1h$, respectively; and the driving pin $5c$ is inserted in an arcuate slot $6k$. The partition plate 6 is provided with a notch 6g for avoiding the stopper 1f, notches 6h, 6i, and 6j for avoiding the mounting shanks 1i, 1j, and 1k, respectively, and holes 6m and 6n for receiving screws to be described later.

Shutter blades 7 and 8 are mounted, next to the partition plate 6. These shutter blades 7 and 8 have holes 7a and 8a and slots 7b and 8b. In their mounting, first, the hole 7a of the shutter blade 7 placed on the side of the base plate 1 is rotatably fitted to shank 1d and the driving pin 5c is inserted in the slot 7b. Next, the hole 8a of the shutter blade 8 is fitted to the fine shank portion of the step shank 1c and the driving pin 5c is inserted in the slot 8b.

Finally, a cover plate 9, with a blade chamber between the partition plate 6 and the cover plate 9, is mounted. The cover plate 9, made of synthetic resin, has a circular aperture section 9a for the photographing optical path at about the middle. The diameter of the aperture section 9a is smaller than that of the aperture section 1a of the base plate 1, but is larger than that of the aperture section 6a of the partition plate 6. The surface of the cover plate 9 on the side of the partition plate 6 is provided with a concavity 9b for arranging the shutter blades 7 and 8 so that they can be operated. In mounting of the cover plate 9, a hole 9c is fitted to the fine shank portion of the step shank 1c; a hole 9d is fitted to the shank 1d; holes 9e, 9f, and 9g are fitted to the stoppers 1e, 1g, and 1h, respectively; and the driving pin 5c is inserted in an arcuate slot 9m. The cover plate 9 is also provided with a notch 9h for avoiding the stopper 1f, notches 9i, 9j, and 9k for avoiding the mounting shanks 1i, 1j, and 1k, respectively, and holes 9n and 9p for receiving screws to be described later.

The cover plate 9 is mounted to the base plate 1 at five places by fixing means. Specifically, two screws, not shown, are inserted in the holes 9n and 9p of the cover plate 9 and the holes 6m and 6n of the partition plate 6 in this order from the solid-state image sensor side, and are threaded into the tapped holes 1m and 1n of the base plate 1. The three mounting shanks 1i, 1j, and 1k provided on the base plate 1 are such that their tips are fused into flange shapes and are hooked to the edges of the notches 9i, 9j, and 9k, respectively. Consequently, in such a mounted state, as seen from FIG. 3A, the partition plate 6 is pressed against the base plate 1 by the cover plate 9 so that the components of the actuator are prevented from moving downward in FIG. 3A from proper positions. In the embodiment, therefore, when the actuator is mounted to the base plate 1, the fixing mean for exclusive use is not employed. Also, although in the embodiment the cover plate 9 is mounted to the base plate 1 at five places, the cover plate 9, it is unnecessary to stick to the number 5 if it is mounted at a plurality of places. In the mounting way of the actuator, either only one of the screw means and the fusion means may be adopted, or other means may be used.

The shutter device of the embodiment, as mentioned above, is provided with the partition plate 6, but the provision of the partition plate 6 is not essential to the present invention. The chief reason that the embodiment is provided with the partition plate 6 is that in order to locate the photographic lens as close as possible to the working surfaces of the shutter blades 7 and 8 for the purpose of attaining the slim design of the camera, the diameter of the aperture section 1a configured in the base plate 1 must be made larger than necessary and thus, instead of doing so, the aperture section 6a of the partition plate 6 is provided as an aperture section for restricting the exposure aperture. Another reason is that in order to reduce the plane area of the base plate 1 for the purpose of attaining the compact design of the shutter device in the embodiment, the components of the actuator, as seen from FIG. 1, are arranged to overlap the operation region of the shutter blades 7 an 8 and thus the shutter blades 7 and 8 are prevented from interfering with the components during operation.

In the case where there is no need to consider these respects, the partition plate 6 may not be provided. Specifically, when it is not necessary to locate the photographic lens as mentioned above, the aperture section 1a of the base plate 1 may be thought as the aperture section for restricting the exposure aperture, or the aperture section 9a of the cover plate 9 may be thought as the aperture section for restricting the exposure aperture, as the case may be. The same holds for the case where the partition plate 6 is provided only for the purpose of reducing the plane area of the base plate 1. When there is no need to reduce the plane area of the base plate 1, it is not required that the components of the actuator is arranged to overlap the operation region of the shutter blades 7 and 8, and hence the partition plate 6 becomes unnecessary. When the partition plate 6 is not provided, it is enough to have the cover plate 9 in a design to maintain a proper arrangement of the components of the actuator instead of it.

When the partition plate 6 is not provided as mentioned above, the number of components is smaller than in the shutter device of each of Kokai Nos. 2003-186079 and 2004-32873, and therefore the entire apparatus can be made slim. Also, although the two shutter blades 7 and 8 are provided in the embodiment, the present invention may be designed signed to have a single shutter blade. Hence, in the present invention, if only the shutter blade 8 is provided and the size and shape of the shutter blade 8 are somewhat changed, the problem only from the operation of the shutter blade 8 will be eliminated. It is thus obvious to those skill in the art that even though the size of the base plate 1 is not intentionally increased, the partition plate 6 becomes unnecessary.

There is a case that is desired to locate the photographic lens as mentioned above, but the plane area of the base plate 1 need not be reduced. In such a case, even when the partition plate 6 must be provided, it is not necessary to cover the shutter device to the lower surface of the actuator as in the embodiment. Consequently, when the shutter device is constructed in this way, instead of the partition plate 6, the cover plate 9, as in the above description, is designed to maintain the proper arrangement of the components of the actuator. In either the case where the partition plate 6 is provided in such an arrangement or where it is provided in an arrangement such as that of the embodiment, the partition plate 6 is located on the blade chamber side of the base plate 1. Thus, unlike a plate member described in each of Kokai Nos. 2003-186079 and 2004-32873, there is no need to consider protection in handling of the device and the thickness of the device can be reduced accordingly. Therefore, it is possible to attain the slim design of the entire apparatus.

As mentioned above, the shutter device of the embodiment has the structure suitable for compact and slim design. The shutter device is thus constructed so that it can be used in various cameras particularly, in a camera for mobile phones easily. FIGS. 5A-5C show an example where the shutter device is placed in the mobile phone when it is used in the camera for mobile phones. As will be seen from these figures, a shutter device S of the embodiment can be located at any place in the mobile phone when occasion demands.

Subsequently, reference is made to the operation of the embodiment. In FIG. 1, the power source of the camera is turned on, but the coil 3 of the actuator is not energized. In this case, however, as is well known, the force of rotation in a counterclockwise direction is imparted to the rotor 5 by an opposite positional relationship between the peripheral surface of the permanent magnet 5a and the magnetic pole sections 2a and 2b of the yoke 2. Hence, by the driving pin 5c, the force of rotation in a clockwise direction is given to the shutter blade 7 and the force of rotation in a counterclockwise direction is given to the shutter blade 8. The shutter blades 7 and 8, however, come in contact with the stoppers 1e and 1g, respectively, and this state is maintained. In this case, the exposure aperture restricted by the aperture section 6a of the partition plate 6 is fully opened so that an image of an object can be observed through a liquid crystal display.

In such an initial state, when a release button (a switch) of the camera is pushed, electric charges stored in the solid-state image sensor are discharged by an electric signal from a control circuit. Whereby, exposure for photography is started and new electric charges are stored. When predetermined time controlled by an exposure time control circuit passes, electric current is supplied to the coil 3 in a forward direction by a signal for exposure completion. Consequently, the rotor 5 is turned in a clockwise direction, and the shutter blades 7 is rotated in counterclockwise and 8 in clockwise direction, respectively, by the driving pin 5c. The shutter blades 7 and 8, just after closing the exposure aperture, abut on the stoppers 1h and 1f, respectively, and are stopped. FIG. 4 shows such a stopped state of the shutter blades.

When a state shown in FIG. 4 is brought about, imaging information stored in the solid-state image sensor is transferred to a memory device. When this transfer is completed, the electric current is supplied to the coil 3 in a reverse direction. Consequently, the rotor 5 is turned in a counterclockwise direction, and the shutter blades 7 is rotated in clockwise and 8 in counterclockwise direction, respectively, by the driving pin 5c. The shutter blades 7 and 8, just after fully opening the exposure aperture, abut on the stoppers 1e and 1g, respectively, and are stopped. After that, when power to the coil 3 is disconnected, the shutter blades reach the initial state shown in FIG. 1 to await the next photography.

Also, although the embodiment is constructed as the shutter device equipped with the two shutter blades 7 and 8, the shutter device may be constructed with a single shutter blade as mentioned above. When this single shutter blade is provided with an aperture section that is smaller in diameter than the aperture section 6a, the embodiment can be used as the stop device. Alternatively, when the single shutter blade is provided with an aperture section of predetermined size and the ND filter plate is mounted on the single shutter blade so as to cover the aperture section, the embodiment can be used as the filter device. In such devices, a specific example where a single blade is provided may be constructed so that the shank 1d and the shutter blade 7 are eliminated, or so that the fine shank portion on the top side of the shank 1c and the shutter blade 8 are eliminated. In the case of the latter structure, therefore, the hole 6b of the partition plate 6 and the hole 9c of the cover plate 9 become unnecessary, and the partition plate 6 comes in contact with the top surface of the thick shank portion of the shank 1c. Any devices constructed as mentioned above assume to be the aspect of the present invention.

Embodiment 2

In accordance with FIGS. 6-9, Embodiment 2 will be explained. In this embodiment, the shutter device and the stop device are constructed as one unit. The structure of the shutter device is substantially same as in Embodiment 1. Thus, in Embodiment 2, the same numerals and symbols as in Embodiment 1 are used for members and parts described in Embodiment 1 and the explanation of these members is omitted. However, Embodiment 2 is equipped with the stop device, in addition to the shutter device. Hence, the base plate 1, the partition plate 6, and the cover plate 9 in Embodiment 2 are larger than in Embodiment 1 and their shapes are partially changed. As such, in Embodiment 2, reference is made to respects that these plate members are different from those of Embodiment 1 and to explain the structure inherent to Embodiment 2.

Since Embodiment 2 is equipped with the stop device, an intermediate plate 10 (see FIG. 7) is interposed between the partition plate 6 and the cover plate 9 so that the blade chamber for the blades 7 and 8 is provided between the partition plate 6 and the intermediate plate 10 and the blade chamber for a stop blade 15 to be described later is constructed between the cover plate 9 and the intermediate plate 10.

Figure 2:
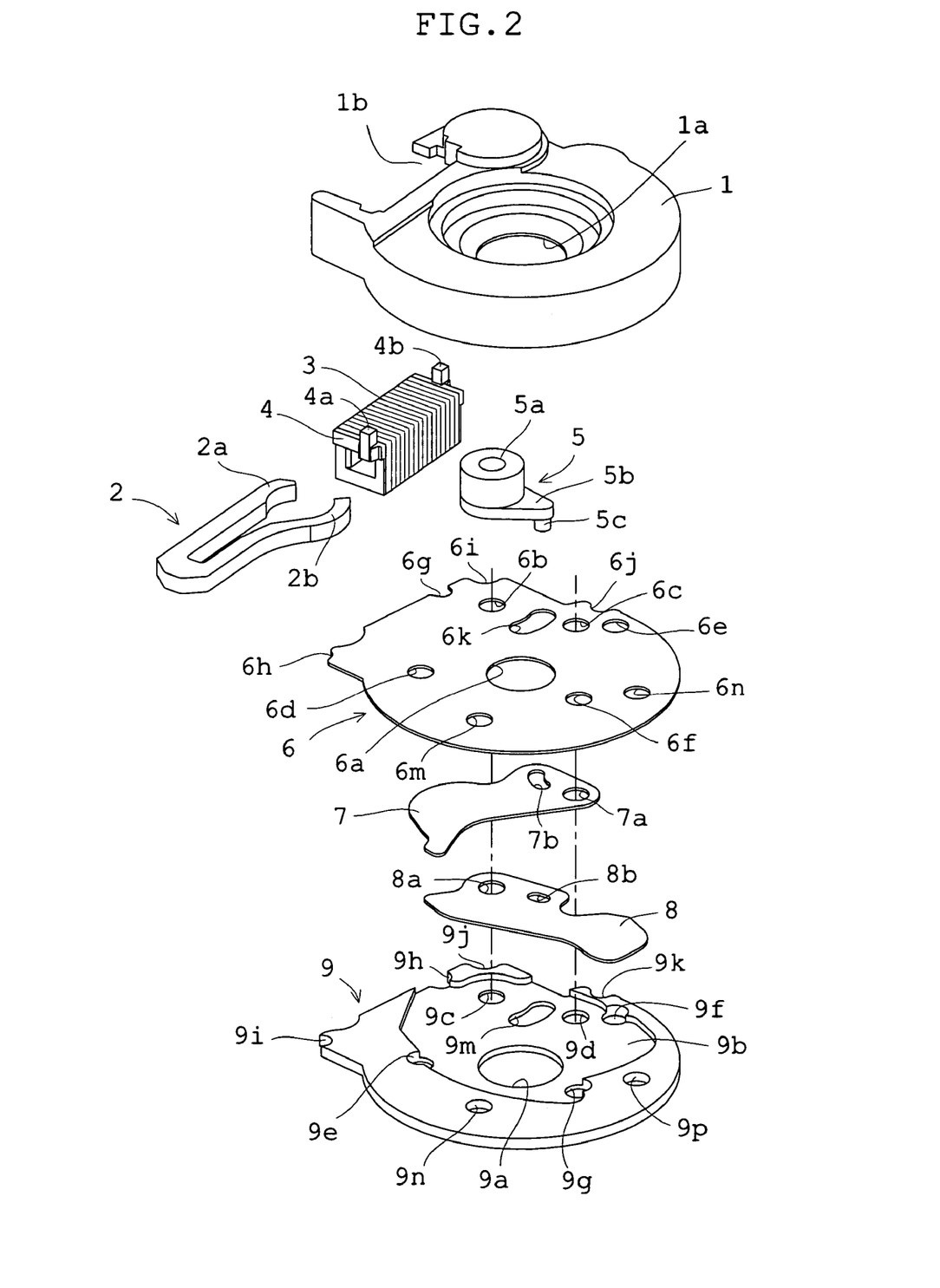
FIG. 2 is a perspective exploded view of Embodiment 1.

In addition to the holes 6b-6e shown in FIG. 2, a plurality of holes in similar shapes, although not shown, are provided to the partition plate 6 of the embodiment. A slot 6p (see FIG. 7) having the same shape as the slot 6k is also provided. However, the holes 6f, 6m, and 6n shown in FIG. 2 are not made.

The intermediate plate 10 is almost identical in contour with the cover plate 9 and has an aperture section 10a for the photographing optical path at about the middle. As will be seen from FIG. 7, its peripheral portion is held between the base plate 1 and the cover plate 9. The diameter of the aperture section 10a is larger than that of the aperture section 9a of the cover plate 9, but is smaller than that of the aperture section 6a of the partition plate 6. Even it is not shown, The intermediate plate 10, like the partition plate 6, is provided with a plurality of holes, fitted to shanks and stoppers provided on the base plate 1 and also has two slots having the same shape as the slots 6k and 6p of the partition plate 6.

Besides the holes 9c-9f shown in FIG. 2, the cover plate 9 is provided with a plurality of holes similar in shapes to those holes, and also has a slot 9q (see FIG. 7) similar in shape to the slot 9m. However, the holes 9g, 9n, and 9p shown in FIG. 2 are not made.

Besides the notch 1b, the base plate 1 of the embodiment has a notch 1r in similar shape on its periphery. The surface on the solid-state image sensor side of the base plate 1 is newly provided with shanks 1s and 1t, two stoppers 1u and 1v, and a mounting shank 1w, but fails to have the stopper 1h and the tapped holes 1m and 1n shown in FIG. 1. The shank 1t, like the shank 1d, passes through individual holes provided to the partition plate 6 and the intermediate plate 10 so that its top is inserted in the hole of the cover plate 9.

The stoppers 1u and 1v, like the stoppers 1e and 1g, pass through individual holes provided to the partition plate 6 and the intermediate plate 10 so that their tops are inserted in individual holes of the cover plate 9. However, the shank 1s, as seen from FIG. 7, is not configured as the step shank like the shank 1c and is shorter than the shank 1c so that the partition plate 6 comes in contact with its top surface. The mounting shank 1w is used for the purpose of mounting the cover plate 9 to its top, together with the mounting shanks 1i, 1j, and 1k, but when the cover plate 9 is mounted, screws may be used as in Embodiment 1.

An actuator for the stop device in the embodiment has substantially the same structure as that for the shutter device mentioned above, and the way of mounting its components is also the same. Therefore, the components will be briefly described and the explanation of their mounting way will be omitted. The stator of the actuator includes a yoke 11 that assumes a U-like shape and has two magnetic pole sections 11a and 11b; a coil 12; and a bobbin 13 having terminal pins 13a and 13b. On the other hand, a rotor 14 includes a permanent magnet 14a, a projection 14b, and a driving pin 14c. In the permanent magnet 14a, its peripheral surface is magnetized to have two poles. The driving pin 14c passes through the slot 6p provided to the partition plate 6 and a slot, not shown, provided to the intermediate plate 10 so that its top is inserted in the slot 9q of the cover plate 9.

The stop blade 15 is placed in the blade chamber interposed between the intermediate plate 10 and the cover plate 9. The stop blade 15 has an aperture section 15a smaller in diameter than the aperture section 6a of the partition plate 6, and a hole 15b is rotatably fitted to the shank 1t of the base plate 1. The stop blade 15 is provided with a slot 15c, through which the driving pin 14c of the rotor 14 is passed.

Subsequently, reference is made to the operation of the embodiment. In FIG. 6, the power source of the camera is turned on, but the coils 3 and 12 of the two actuators are not energized. In this case, the force of rotation in a counterclockwise direction is imparted to the rotor 5, while the force of rotation in a counterclockwise direction is also imparted to the rotor 14. Hence, by the driving pin 5c, the force of rotation in the clockwise direction is given to the shutter blade 7, while the force of rotation in the counterclockwise direction is given to the shutter blade 8. The shutter blades 7 and 8, however, come in contact with the stopper 1e and 1g, respectively, and thereby this state is maintained. Although the force of rotation in the clockwise direction is given to the stop blade 15 by the driving pin 14c, the stop blade 15 comes in contact with the stopper 1u and thereby this state is maintained. In this state, the exposure aperture restricted by the aperture section 6a of the partition plate 6 is fully opened so that the image of the object can be observed through the liquid crystal display.

In such an initial state, when the release button (the switch) of the camera is pushed, the light of the object is measured by a photometric device. When the light of the object is relatively dark, only the shutter device is operated in almost the same manner as in Embodiment 1 even though the stopper 1h is not provided. When the light is relatively bright, the stop device, followed by the shutter device, is operated. In either case, the operation itself of the shutter device is the same. Thus, in the following explanation of the operation, only the latter case will be described to avoid duplication.

In order to first operate the stop blade 15, the electric current is supplied to the coil 12 in a forward direction. Consequently, the rotor 14 is turned in the clockwise direction, and the stop blade 15 is rotated in the counterclockwise direction by the driving pin 14c. The stop blade 15 abuts on the stopper 1v and is stopped. FIG. 8 shows such a stopped state of the stop blade 15.

Figure 9:
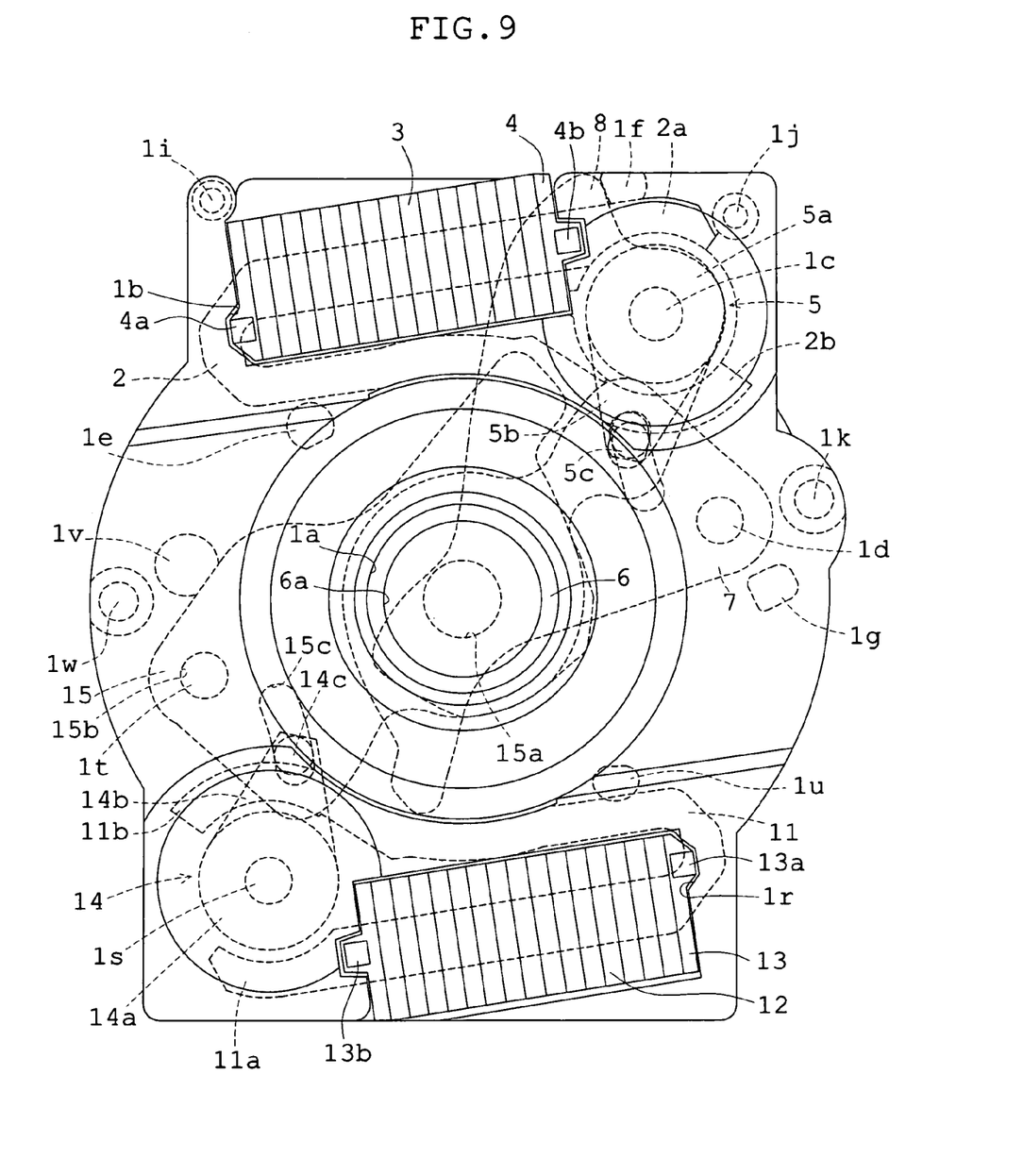
FIG. 9 is a plan view showing a state of Embodiment 2 just after finishing photography.

Next, in this state, electric charges stored in the solid-state image sensor are discharged. Whereby, exposure for photography is started and new electric charges are stored. When predetermined time controlled by the exposure time control circuit passes, the electric current is supplied to the coil 3 in a forward direction by the signal for exposure completion. Consequently, the rotor 5 is turned in the clockwise direction, and the shutter blades 7 and 8 are rotated in opposite directions by the driving pin 5c. Just after the shutter blades 7 and 8 close the aperture section 15a of the stop blade 15, the shutter blade 8 abuts on the stopper 1f and is stopped. FIG. 9 shows such a stopped state of the shutter blades. Also in this case, even though the shutter blade 7 fails to abut on the stopper, the shutter blades 7 and 8 can be favorably stopped because the driving pin 5c is engaged with the slots 7b and 8b.

When a state shown in FIG. 9 is brought about, image information stored in the solid-state image sensor is transferred to the memory device. When this transfer is completed, the electric current is supplied to the coil 3 in the reverse direction. Consequently, the rotor 5 is turned in the counterclockwise direction so that the shutter blades 7 and 8 perform the opening operation. The shutter blades 7 and 8 abut on the stoppers 1e and 1g, respectively, and thereby are stopped. On the other hand, since the electric current is also supplied to the coil 12 in the reverse direction, the rotor 14 is turned in the counterclockwise direction so that the stop blade 15 is rotated in the clockwise direction. The stop blade 15 abuts on the stopper 1u and thereby is stopped. After that, when the power to the coils 3 and 12 is disconnected, a state shown in FIG. 6 is reached to await the next photography.

In the embodiment, the shutter device and the stop device are constructed as one unit, and the shutter blades and the stop blade are placed in separate blade chambers. For example, Kokai No. 2003-5251 discloses the structure that a shutter blade and a stop blade, or a shutter blade and a filter blade, are arranged in a single blade chamber. However, the present invention may be constructed in such an aspect, or in the aspect that the stop blade and the filter blade are arranged in the single blade chamber. Kokai No. 2002-139765 discloses the structure that two blade chambers are provided, with an intermediate plate as a boundary between them, so that the shutter blade is placed in one blade chamber and the stop blade is placed in the other blade chamber or so that the shutter blade is placed in one blade chamber and the filter blade is placed in the other blade chamber. However, the present invention may be constructed in such an aspect, or in the aspect that the stop blade is placed in one blade chamber and the filter blade is placed in the other blade chamber.

Japanese Patent Kokai No. 2001-188275 sets forth the structure that two blade chambers are provided, with an intermediate plate as a boundary between them, so that the shutter blade is placed in one blade chamber and the stop blade and the filter blade are arranged in the other blade chamber. However, the present invention may be constructed in such an aspect.

Also, although each of the actuators described in Embodiments 1 and 2 is similar in structure to that set forth in Kokai No. 2003-186079, the actuator of the present invention is not limited to that construction. For example, the actuator set forth in Kokai No. 200-32873 can also be adopted. In this case, however, when the base plate 1 is shaped as in each embodiment mentioned above, it becomes difficult to wind the coil. Therefore, it is necessary to divide the base plate 1 previously into two members so that the coil is wound around at least one of the members and then the two members are integrally constructed.

What is claimed is:

1. A blade driving apparatus for cameras, comprising:
a base plate having an aperture for a photographing optical path;
a cover plate having the aperture for the photographing optical path, provided with a blade chamber formed between the base plate and the cover plate;
at least one blade rotatably mounted to the base plate in the blade chamber; and at least one electromagnetic driving source configured to drive the blade, the electromagnetic driving source including:
a rotor magnetized to have a plurality of magnetic poles at preset angles on a peripheral surface and having a driving pin for driving the blade by rotation thereof;
a yoke having a plurality of magnetic pole sections opposite to the peripheral surface of the rotor; and
a coil wound through the yoke,
at least, the rotor and the yoke of the electromagnetic driving source being interposed between the base plate and the cover plate, the rotor being rotatably mounted to the base plate.

2. A blade driving apparatus for cameras according to claim 1, wherein the rotor has a through-hole at a center of rotation thereof so that the through-hole is rotatably fitted to a shank provided on the base plate.

3. A blade driving apparatus for cameras according to claim 2, wherein a partition plate having the aperture section for the photographing optical path is interposed between the base plate and the cover plate, the electromagnetic driving source is placed between the base plate and the partition plate, and the blade chamber is provided between the partition plate and the cover plate.

4. A blade driving apparatus for cameras according to claim 1 or 3, wherein the yoke is held, together with the coil, between the base plate and the cover plate or between the base plate and the partition plate.

5. A blade driving apparatus for cameras according to claim 3, wherein an intermediate plate having the aperture section for the photographing optical path is interposed between the base plate and the cover plate or between the partition plate and the cover plate; two blade chambers are provided, with the intermediate plate as a boundary between the two blade chambers; two electromagnetic driving sources are interposed between the base plate and the intermediate plate or between the base plate and the partition plate; and blades in-dependently driven by the two electromagnetic driving sources are housed in the two blade chambers, with at least one blade in each chamber.

6. A blade driving apparatus for cameras, comprising:
- a base plate having an aperture section for a photographing optical path and at least, a first shank provided to one surface;
- a cover plate having the aperture section for the photographing optical path and at least, a first hole, and a blade chamber between the base plate and the cover plate;
- at least one blade having a hole and a slot;
- a rotor constructed of a permanent magnet, having a driving pin engaged with the slot of the blade to operate the blade, a through-hole at a center of rotation, and a plurality of magnetic pole sections on a peripheral surface; and
- a yoke having a plurality of magnetic poles opposite to the peripheral surface of the rotor, fitted into a bobbin around which a coil is wound,
- the yoke being mounted on the one surface of the base plate and the through-hole of the rotor is rotatably fitted to the first shank,
- the hole of the blade being rotatably fitted to the first shank and the slot of the blade being engaged with the driving pin,
- the first hole is fitted to the first shank to thereby mount the cover plate to the base plate so that the yoke and the bobbin are held between the base plate and the cover plate.

7. A blade driving apparatus for cameras according to claim 6, wherein the base plate is provided with a second shank in addition to the first shank; the cover plate is provided with a second hole in addition to the first hole; the hole of the blade is rotatably fitted to the first shank or the second shank and the slot of the blade is engaged with the driving pin; and the first hole and the second hole are fitted to the first shank and the second shank, respectively, so that the cover plate is mounted to the base plate.

8. A blade driving apparatus for cameras according to claim 6, wherein the base plate is provided with a second shank in addition to the first shank; the cover plate fails to have the first hole and is provided with a second hole different from the first hole; the hole of the blade is rotatably fitted to the second shank and the slot of the blade is engaged with the driving pin; and the second hole is fitted to the second shank so that the cover plate is mounted to the base plate.

9. A blade driving apparatus for cameras according to any one of claims 6-8, wherein a partition plate having the aperture section for photography is interposed between the yoke fitted into the bobbin and the cover plate, and the blade chamber is provided between the partition plate and the cover plate.

10. A blade driving apparatus for cameras according to claim 6 or 7, wherein, instead of the at least one blade, two blades are provided so that one blade has the hole rotatably fitted to the first shank and a remaining blade has the hole rotatably fitted to the second shank, and the two blades are rotated in opposite directions by driving pins engaged with slots of the two blades.

11. A blade driving apparatus for cameras according to claim 6 or 7, wherein an intermediate plate having the aperture section for the photographing optical path is interposed between the base plate and the cover plate or between the partition plate and the cover plate; two blades chambers are provided, with the intermediate plate as a boundary between the two blade chambers; two sets of yokes fitted into bobbins and rotors are arranged between the base plate and the intermediate plate or between the base plate and the partition plate; and blades independently driven by the rotors are provided in the two blade chambers, at least one in each chamber.

* * * * *

UNITED STATES PATENT AND TRADEMARK OFFICE
CERTIFICATE OF CORRECTION

| | | |
|---|---|---|
| PATENT NO. | : 7,410,310 B2 | Page 1 of 1 |
| APPLICATION NO. | : 11/168326 | |
| DATED | : August 12, 2008 | |
| INVENTOR(S) | : Kihara | |

It is certified that error appears in the above-identified patent and that said Letters Patent is hereby corrected as shown below:

On Title Page, Item 57

In the Abstract, line 10, please delete the consecutive words "for driving pin".

The line should read: "having a driving pin for driving the blade by its".

Signed and Sealed this

Sixteenth Day of December, 2008

JON W. DUDAS
*Director of the United States Patent and Trademark Office*